E. D. DICKINSON AND J. WILKINSON.
FLEXIBLE COUPLING.
APPLICATION FILED MAY 9, 1919.

1,352,251.

Patented Sept. 7, 1920.
2 SHEETS—SHEET 1.

Inventors:
Edgar D. Dickinson,
James Wilkinson,
by Albert G. Davis
Their Attorney.

E. D. DICKINSON AND J. WILKINSON.
FLEXIBLE COUPLING.
APPLICATION FILED MAY 9, 1919.

1,352,251.

Patented Sept. 7, 1920.
2 SHEETS—SHEET 2.

Inventors:
Edgar D. Dickinson,
James Wilkinson,
by Albert G. Davis
Their Attorney.

UNITED STATES PATENT OFFICE.

EDGAR D. DICKINSON AND JAMES WILKINSON, OF SCHENECTADY, NEW YORK, ASSIGNORS TO GENERAL ELECTRIC COMPANY, A CORPORATION OF NEW YORK.

FLEXIBLE COUPLING.

1,352,251.  Specification of Letters Patent.  Patented Sept. 7, 1920.

Application filed May 9, 1919. Serial No. 295,921.

*To all whom it may concern:*

Be it known that we, EDGAR D. DICKINSON and JAMES WILKINSON, citizens of the United States, residing at Schenectady, county of Schenectady, State of New York, have invented certain new and useful Improvements in Flexible Couplings, of which the following is a specification.

The present invention relates to flexible couplings for connecting a driving member to a driven member and has for its object to provide an improved structure and arrangement in a coupling of this character.

For a consideration of what we believe to be novel and our invention, attention is directed to the accompanying description and the claims appended thereto.

Figure 1:
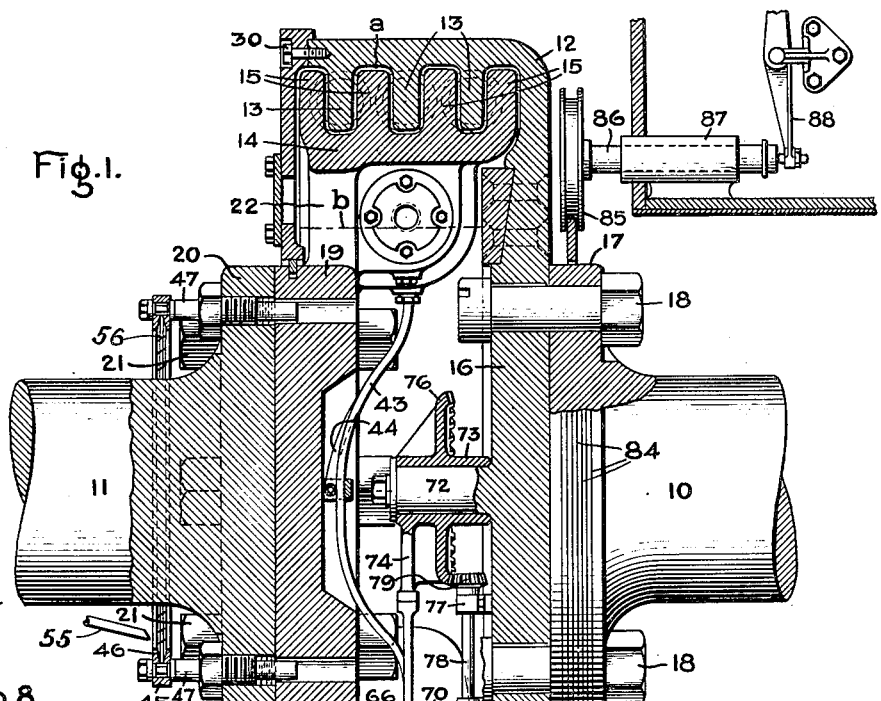
Figure 8:
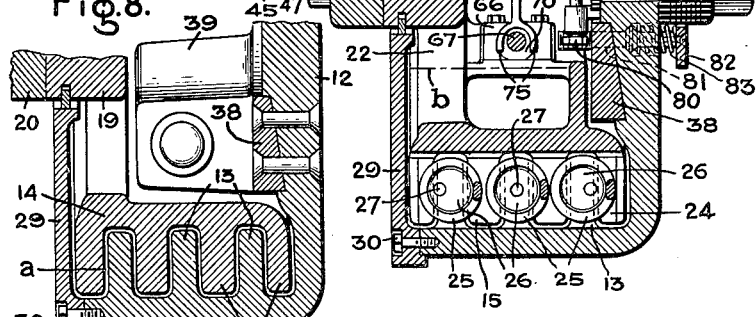
Figure 2:
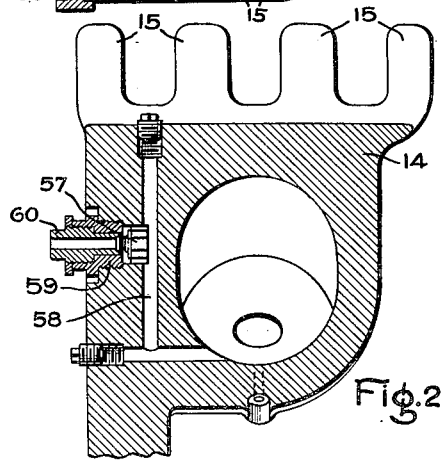
Figure 3:
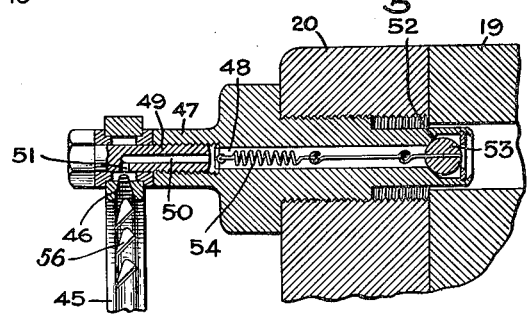
Figure 4:
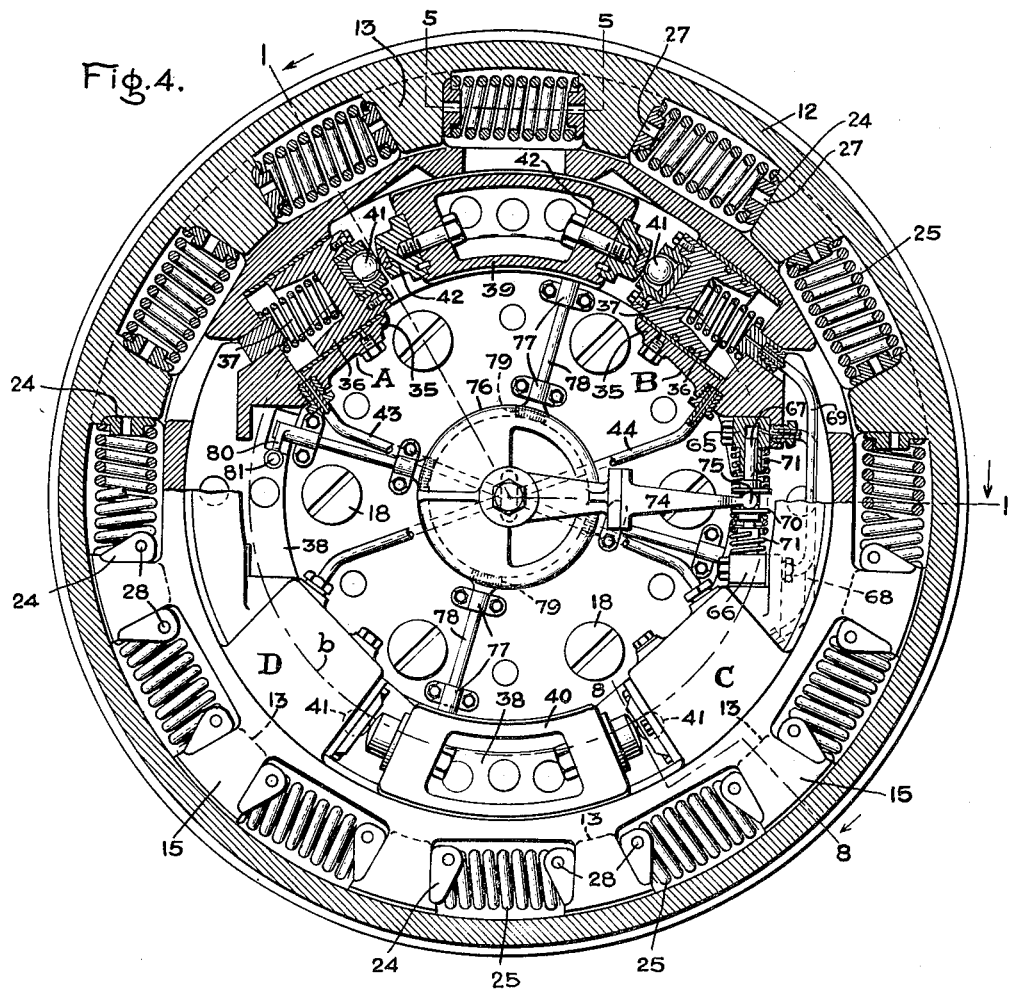
Figure 5:
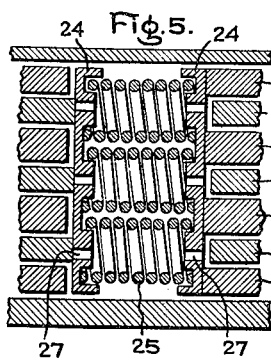
Figure 6:
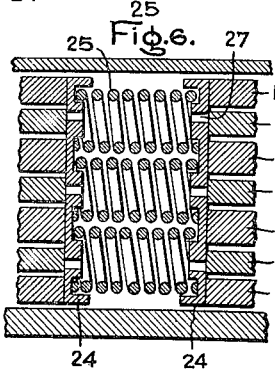
Figure 7:
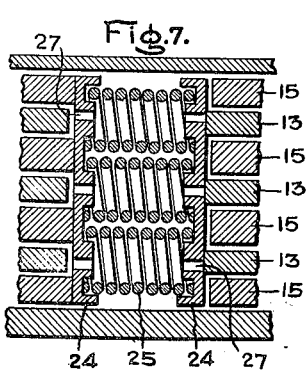

In the drawing, Figure 1 is a longitudinal sectional view of a coupling embodying our invention, the section being taken on line 1—1, Fig. 4; Figs. 2 and 3 are sectional views of details; Fig. 4 is a transverse sectional view; Figs. 5, 6 and 7 are sectional plan views taken on line 5—5, Fig. 4, showing certain parts in different operative positions, and Fig. 8 is a detail sectional view taken on line 8—8, Fig. 4.

In the present instance our invention is shown as connecting together two shafts 10 and 11, one of which is a driving shaft and the other a driven shaft.

The coupling comprises an outer coupling member 12 having circumferentially spaced transverse rows of inwardly projecting teeth 13, and an inner coupling member 14 having circumferentially spaced transverse rows of outwardly projecting teeth 15, which interleave with teeth 13. Outer coupling member 12 is carried by shaft 10 and is shown as being formed integral with an annular plate 16 which is fastened to a bolting flange 17 on shaft 10 by bolts 18. Inner coupling member 14 is carried by shaft 11 and is shown as being formed integral with an annular plate 19 fastened to a bolting flange 20 on shaft 11 by bolts 21. In plate 19 are a number of openings 22 to give access to and permit inspection of parts within the coupling.

Interleaving teeth 13 and 15 are of the same circumferential dimensions, thus forming single rows of teeth extending axially of the coupling, and fitting against such rows are rectangular spring shoes 24, which are of a length equal to the total width of teeth 13 and 15 so they extend entirely across the edges of such teeth. Bearing against the spring shoes 24 are springs 25, the shoes being provided with bosses 26 for centering the springs. The coils of springs 25 are of such diameter that they exert a pressure on two adjacent teeth in an axial direction on member 14 and on the intermediate tooth of the other member 12, in the present instance three springs being utilized. It will be understood, however, that a greater or fewer number of springs, and also of teeth, may be used as found desirable. To facilitate assembling of the springs and spring shoes between the teeth, the spring shoes are provided with openings 27 through bosses 26 through which bolts may be passed. When assembling two spring shoes 24 are placed in spaced relation to each other with springs 25 in position between them and bolts are passed through openings 27 and nuts are screwed thereon to squeeze the spring shoes together and compress the springs between the shoes to an extent to give the desired spring compression and also to bring the shoes close enough together to slip between the rows of teeth. One end of the plates is then inserted between two rows of teeth and pushed inward until the movement is arrested by the first bolt. This bolt is then removed and the plates are then pushed inward until the movement is arrested by the second bolt. The second bolt is then removed and the operation continued in a similar manner until the shoes and springs are entirely in place. In withdrawing the shoes and springs this procedure will be reversed so the springs and shoes will be held together in correct relative position for reinsertion. In the end flanges of shoes 24 are threaded openings 28 to receive a suitable device for use in removing the springs. The foregoing forms a very simple assembling arrangement and permits of the springs being inserted with any required degree of initial compression. A cover plate 29 is fastened to coupling member 12 by bolts 30 to keep the spring shoes and springs in place and prevent the entrance of foreign matter between the two coupling members.

It will be noted that there is a suitable amount of clearance, both radial and axial, between coupling members 12 and 14 and the teeth 13 and 15 formed thereon, as indicated at a, and this allows for a considerable error in alinement of the two shafts and also for slight axial or radial relative movements which may occur during operation such as may be caused, for example, by gearings getting out of alinement, or by expansion or contraction due to temperature changes. In other words, the coupling arrangement has universal alinement flexibility, and will permit of a considerable degree of angular displacement of the two adjacent shaft sections from parallel.

When the coupling is at rest, the springs 25 assume a mid position as shown in Fig. 6, the teeth 13 and 15 all being in engagement with spring shoes 24. Springs 25, however, are under compression as they are preferably put into place with a certain degree of initial compression depending on the requirements of the particular application. It will be noted that the spring shoes 24 extend entirely across the coupling and this is very desirable as it serves to distribute the spring pressure evenly across the coupling even though certain springs may be under greater compression than others either initially or due to disalinement. When load is on the coupling, as soon as the initial tension of the springs is overcome, the springs yield to permit the two parts of the coupling to move circumferentially relatively to each other, the direction of the movement depending upon the direction in which the torque is applied. Fig. 5 illustrates the action when the torque is in one direction and Fig. 7 illustrates the action when it is in the other direction. And in either case it will be noted that due to the spring shoes extending entirely across the coupling the spring pressure is evenly distributed across the coupling.

The springs 25 act to absorb and release all torsional impulses and vibrations. For the purpose of governing the duration of the time of absorption and release of impulses we provide ahead and reverse acting oil dashpots or plungers of high power. These dashpots also serve to prevent the establishment of oscillations between the two parts of the coupling. The action of the dashpots is under the control of special check valves and these can be adjusted so that the resistance and resiliency of the coupling conform to the necessities of practical operation.

Referring to Fig. 4, in the upper half of the coupling, are two dashpots A and B and in the lower half are two dashpots C and D. These dashpots each comprise cylinders 35 carried by and preferably formed integral with the inner coupling member 14 and pistons 36 located in cylinders 35 and pressed outward by springs 37. The dashpots A and B have their open ends facing each other and likewise the dashpots C and D. Riveted to the annular plate 16 of outer coupling member 12 is an abutment ring 38 carrying an abutment 39 which is located between dashpots A and B and an abutment 40 which is located between dashpots C and D. Each piston 36 has preferably a ball 41 in its end and the abutments 39 and 40 have wear pieces 42 which engage such balls. It will be clear that dashpots A and B and dashpots C and D act in opposite directions and that dashpots A and C and dashpots B and D act in the same direction. To equalize the pressure in the dashpots acting in the same direction the cylinders of dashpots A and C are connected by an equalizing pipe 43 and the cylinders of dashpots B and D are connected by an equalizing pipe 44.

To supply oil to the interior of the coupling for the dashpots and for lubricating purposes an oil supply ring 45 having an annular groove 46 is fastened to bolting flange 20 by means of studs 47 having longitudinally extending holes 48 therethrough, the ring being fastened to the outer ends of studs 47 by smaller studs 49 (see Fig. 3), which are provided with longitudinally extending holes 50 which at their inner ends communicate with holes 48 and at their outer ends communicate with grooves 46 through a transverse opening 51. At the inner ends of studs 47 are valve seats 52 and ball check valves 53 which open toward the interior of the coupling. Valves 53 are normally held against seats 52 by springs 54. Oil may be supplied to groove 46 in oil ring 45 in any suitable manner, a pipe 55 being shown in Fig. 1 for this purpose, and after entering groove 46 the oil is thrown out by centrifugal force, a pressure being built up which forces oil through openings 51 and holes 50 and 48, and past valves 53 to the interior of the coupling. If found desirable groove 46 may be provided with vanes 56 to assist in building up the desired oil pressure. When the coupling is rotating, there will be established therein a centrifugal oil level as indicated by the dot and dash line b in Figs. 1 and 4. Valves 53 serve as check valves to prevent oil from escaping from the interior of the coupling when it is not rotating.

Oil is fed from the interior of the coupling to the cylinders of the dashpots and is discharged from such cylinders back to the interior of the coupling through suitable valves 57 (Fig. 2) located in passages 58 which lead to the cylinder chambers, the arrangement being such that while oil is freely admitted past valves 57 to the cylinders its discharge therefrom is restricted by an amount depending upon the adjustments of the valves. To this end valves 57 may be in the form of inwardly opening check valves so arranged that they are always held slightly off their seats. When a piston 36 moves outwardly in a cylinder 35, oil will be readily sucked by valve 57; when moved in the opposite direction, however, the pressure of the oil in the cylinder will force the valve toward its seat and restrict the passage through which oil may escape. In the present instance the movable part of the valve when forced toward closed position strikes the edge of a sleeve 59. The seat of the valve is formed on the end of a sleeve 60 which is threaded into the outer end of sleeve 59. By adjusting the sleeve 60 relatively to sleeve 59 to bring the valve seat nearer to or farther from the end of sleeve 59, the area of the passage for the escape of oil may be varied, and hence the action of the dashpot.

It is desirable that valves 57 be so adjusted that the escape passages are of such area as to cause the dashpots to offer the desired amount of resistance to movements of the coupling and as a guide for indicating what these adjustments should be an indicating and recording means is provided operated by the pressure in the dashpots. Referring to Figs. 1 and 4, 65 and 66 are opposed cylinders carried by cylinders B and C, and 67 is a rod, the two ends of which are located in cylinders 65 and 66 thus forming pistons for them. Cylinder 65 is connected to cylinder C by a pipe 68 and cylinder 66 is connected to cylinder B by a pipe 69. Piston rod 67 thus forms a movable abutment, the opposite ends of which are subjected to the pressures in oppositely facing dashpot cylinders. Fastened to the central portion of piston rod 67 is a sleeve having a pair of spaced collars 70 thereon and arranged between each collar and the adjacent cylinder 65 or 66 is a suitable spring 71, which springs serve to normally center piston rod 67. Pivoted on a hub 72, projecting from plate 16, is a sleeve 73 having an arm 74 which terminates in furcations 75 located between collars 70. On sleeve 73 is a gear wheel 76 and carried by bearings 77 on plate 16 are a number of spaced, radially extending shafts 78 having gear wheels 79 at one end which mesh with gear wheel 76. At the other ends of shafts 78 are toothed segments 80 which mesh with teeth on the inner ends of rods 81. Rods 81 extend through openings in plate 16 and at their outer ends are fixed to an indicator ring 82 which surrounds bolting flange 17. Surrounding the outer ends of rods 81 are springs 83 which are located in counter bores in flange 17 and bear at one end against ring 82 and at the other end against the bottom of the counter bores. In the present instance four shafts 78 and rods 81 are shown spaced about 90° apart so as to give an even movement to indicator ring 82. Whenever, due to difference in pressure in cylinders 65 and 66, piston rod 67 moves, arm 74 will be turned, thus turning gear wheel 76 which in turn turns shafts 78. The turning of shafts 78 will cause rods 81 to move longitudinally, thus moving indicator ring 82. On the periphery of flange 17 a suitable scale is marked as indicated by lines 84 and the movements of ring 82 over this scale may be observed. Also engaging with ring 82 is a grooved wheel 85 carried on one end of an axially movable shaft 86 supported in a bearing 87. The other end of shaft 86 bears against the end of a lever 88 which is the movable element of a recording device. The recording device is not illustrated in detail as its specific structure forms no part of the present invention, but it will be understood that it comprises a usual form of pen arm and continuously driven chart upon which the pen works. By observing the movements of the indicator ring 82 and the record made on the chart, the action of the dashpots A, B, C and D can be determined and adjusted to give the desired resistance to the movements of the two parts of the coupling relatively to each other.

In assembling the coupling, pistons 36 may be fastened temporarily within the confines of cylinders 35 by means of suitable dowels extending through holes in the cylinder walls, which dowels are removed after the assembling is completed.

In addition to the advantages already pointed out, our improved coupling has the further advantages that it is very compact in arrangement and convenient to manufacture and assemble, and that all the parts are entirely inclosed and protected.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is,—

1. In combination, concentric driving and driven members, transverse rows of interleaving axially alined teeth carried thereby, spring shoes which extend throughout the length of the rows of teeth, and springs engaging said spring shoes.

2. In combination, concentric driving and driven members, transverse rows of interleaving teeth carried thereby, said members and teeth being spaced apart both radially and axially, spring shoes which extend throughout the length of the rows of teeth, and springs engaging said spring shoes.

3. In combination, concentric driving and driven members, transverse rows of interleaving teeth carried thereby, spring shoes which extend throughout the length of the rows of teeth, springs engaging said spring shoes, and dashpots acting in both directions which are arranged concentric with said members and have parts connected to each of them.

4. In combination, concentric driving and driven members, transverse rows of interleaving teeth carried thereby, spring shoes which extend throughout the length of the rows of teeth, springs engaging said spring shoes, dashpots acting in both directions which are arranged concentric with said members and within the same and have parts connected to each of them.

5. In combination, concentric driving and driven members, transverse rows of interleaving teeth carried thereby, spring shoes which extend throughout the length of the rows of teeth, and springs carried between said spring shoes, said members being open on one side and closed on the other, whereby a pair of spring shoes with springs between them may be slipped axially from said open side between two rows of teeth.

6. In combination, concentric driving and driven members, transverse rows of interleaving teeth carried thereby, spring shoes which extend throughout the length of the rows of teeth, springs engaging said spring shoes, dashpots acting in both directions which are arranged concentric with said members and have parts connected to each of them, and means for supplying oil to said dashpots.

7. In combination, concentric driving and driven members, transverse rows of interleaving teeth carried thereby, spring shoes which extend throughout the length of the rows of teeth, springs engaging said spring shoes, dashpots acting in both directions which are arranged concentric with said members and have parts connected to each of them, means for supplying oil to said dashpots, and equalizing pipes which connect together the dashpots acting in the same direction.

8. In combination, concentric driving and driven members, spring means connecting them together for transmision of load in either direction, dashpots comprising cylinders connected to one of said members and having pistons therein, some of said cylinders facing in one direction and others facing in the opposite direction, abutments carried by the other of said members, and engaging said pistons, means for supplying oil to said cylinders, and equalizing pipes connecting the dashpots which face in the same direction.

9. In combination, concentric driving and driven members, spring means connecting them together for transmission of load in either direction, dashpots carried by one of said members comprising pairs of oppositely facing cylinders having pistons therein, abutment means located between each pair of cylinders and carried by the other of said members, said abutment means engaging the pistons of such cylinders, and means for supplying oil to said cylinders.

10. In combination, concentric driving and driven members, spring means connecting them together for transmission of load in either direction, dashpots carried by one of said members comprising pairs of oppositely facing cylinders having pistons therein, abutment means located between each pair of cylinders and carried by the other of said members, said abutment means engaging the pistons of such cylinders, means for supplying oil to said cylinders, and equalizing pipes connecting the cylinders which face in the same direction.

11. In combination, concentric driving and driven members, spring means connecting them together for transmission of load in either direction, dashpots carried by one of said members comprising pairs of oppositely facing cylinders having pistons therein, abutment means located between each pair of cylinders and carried by the other of said members, said abutment means engaging the pistons of such cylinders, and means for indicating the difference in oil pressure of oil within oppositely facing cylinders.

12. In combination, concentric driving and driven members, spring means connecting them together for transmission of load in either direction, dashpots comprising cylinders connected to one of said members and having pistons therein, some of said cylinders facing in one direction and others facing in the opposite direction, abutments carried by the other of said members and engaging said pistons, means for supplying oil to said cylinders, a movable abutment, means connecting said abutment on one side to a cylinder facing in one direction and on the other side to a cylinder facing in the opposite direction, and means for indicating the movements of said abutment.

In witness whereof we have hereunto set our hands this 8th day of May, 1919.

EDGAR D. DICKINSON.
JAMES WILKINSON.